United States Patent [19]

Ivancheva et al.

[11] 4,169,194

[45] Sep. 25, 1979

[54] PROCESS FOR PRODUCING POLYETHYLENE

[76] Inventors: Neonila I. Ivancheva, ulitsa Nalichnaya, 36, korpus 3, kv. 97; Vladimir I. Pilipovsky, ulitsa Voinova, 9, kv. 6; Rita E. Prokofieva, prospekt Bolshevikov, 19, kv. 9; Elena I. Nalivaiko, ulitsa Bronnitskaya, 1/3, kv. 39; Maria A. Budanova, B. Okhtinsky prospekt, 14, kv. 130, all of Leningrad, U.S.S.R.

[21] Appl. No.: 928,694

[22] Filed: Jul. 27, 1978

[51] Int. Cl.² .......................... C08F 4/68; C08F 10/02
[52] U.S. Cl. ............................ 526/153; 252/431 R; 526/141; 526/163; 526/352
[58] Field of Search ....................... 526/141, 153, 163

[56] References Cited

U.S. PATENT DOCUMENTS

| | | | |
|---|---|---|---|
| 3,313,794 | 4/1967 | Cleary | 526/352 |
| 3,400,113 | 9/1968 | Winter et al. | 526/141 |

FOREIGN PATENT DOCUMENTS 1124692  3/1962  Fed. Rep. of Germany ........... 526/141

Primary Examiner—Edward J. Smith
Attorney, Agent, or Firm—Steinberg & Blake

[57] ABSTRACT

A process for producing polyethylene comprising polymerizing ethylene in a medium of a hydrocarbon solvent at a temperature within the range of from 30° to 110° C. under a pressure of from 1 to 60 atm.g. in the presence of a complex organometallic catalyst; said catalyst consisting of an alkylaluminiumhalide of the formula $AlR_n(X)_{3-n}$ (I), wherein R is an alkyl with a number of carbon atoms from 2 to 18; X is Cl, Br, I; n=1 or 2; an oxyvanadiumalkoxide of the formula $OV(OR')_3$ (II), wherein R' is an alkyl with a number of carbon atoms from 2 to 20; and a complex of acrylonitrile with diethylaluminiumchloride of the formula $CH_2=CHCN.Al(C_2H_5)_2Cl$ (III); molar ratio between said catalytic components I:II:III being equal to 5–20:1:1–5, respectively. The process makes it possible to obtain polyethylene with a wide (5 to 10) molecular-mass distribution and with an enhanced adhesion to a metal (more than 3000 g/cm). Polyethylene possessing the above-cited characteristics is readily processed by the extrusion method to articles of household and industrial applications.

1 Claim, No Drawings

PROCESS FOR PRODUCING POLYETHYLENE

FIELD OF APPLICATION OF THE INVENTION

The present invention relates to processes for producing polyolefins and, more specifically, to a process for producing polyethylene by polymerization of ethylene in a solvent in the presence of Ziegler-Natta catalysts with a subsequent separation of the polymer in the form of a powder.

Polyethylene, due to its high physico-mechanical and dielectric properties and chemical stability, is widely used in the manufacture of articles for household and industrial application.

BACKGROUND OF THE INVENTION

To produce polyethylene with preset properties meeting the requirements of processing and operation of the articles, a great importance is attached to molecular weight of polyethylene and, in particular, to molecular-mass distribution (MMD).

It is a widespread opinion that polyolefins obtained on Ziegler-Natta catalysts have a high MMD (more than 10) (H. Wesslau, Makrom, Chem., 20, 111, 1956), but as early as 1958, the same author (H. Wesslau, Makrom. Chem., 26, 102, 1958) published the data which show that polyethylene with MMD about 2 can be obtained on said catalytic systems.

In many patents it is proposed to introduce different additives for narrowing or widening MMD. Such additives can be alcohols (U.S. Pat. No. 3,163,611), phenols (U.S. Pat. No. 3,150,122), organic and inorganic acids and the salts thereof (U.S. Pat. Nos. 2,912,425 and 3,682,198; British Pat. No. 975,675), water (U.S. Pat. Nos. 3,184,416 and 3,440,237; FRG Pat. No. 1,022,382; French Pat. No. 1,361,252), organic oxides and esters (FRG Pat. No. 1,098,715).

Known in the art is a process for producing polyethylene by polymerization of ethylene in a medium of a hydrocarbon solvent at a temperature within the range of from $-20°$ to $+150°$ C. under a pressure of from 1 to 70 atm.g. in the presence of a complex organometallic catalyst consisting of alkylaluminiumhalide of the general formula $AlR_n(X)_{3-n}(I)$, wherein R is an alkyl with a number of carbon atoms from 1 to 10, X is Cl, Br, Y, or F, n=1 or 2; oxyvanadiumalkoxide of the formula $OV(OR')_3(II)$, wherein R' is an alkyl with a number of carbon atoms from 1 to 20, at a molar ratio between the catalytic components I:II equal to 5-100:1, respectively (U.S. Pat. No. 3,313,794).

Polyethylene produced by the above known method has a number of advantages as compared with polyethylene obtained on other catalytic systems (for example, on a complex organometallic catalyst consisting of diethylaluminiumchloride $Al(C_2H_5)_2Cl$ and titanium tetrachloride $TiCl_4$): high impact viscosity and tensile strength, higher transparency and brilliance of the film surface, etc. This makes it possible to widely use this polyethylene in making linear articles, reinforcement for water supply for engineering purposes; in machine-engineering; noiseless gears in high-speed machines with a low load; in automobile construction; fuel tanks, etc.

Said known method of producing polyethylene has a disadvantage in that the final polyethylene has a narrow MMD equal to 2-3. Organometallic catalysts of the same type as those described in the known method give polymers with a narrow MMD (W. L. Carrick et al., J. Amer. Chem. Soc., 81, 3883, 1960; E. A. Fuschman et al., Izv. AN SSSR, ser. khim., 1965, 2075). Polyethylene with a narrow MMD is used mainly for manufacturing articles by moulding (M. Leegwater, SPE Journal, 25, 47, 1969). For manufacturing articles by extrusion (for instance, cable or pipes) polyethylene is required with medium (5-7) and high (above 10) MMD (Karasev et al., Plastic materials, 1974, 6, 40), especially in the case of highly molecular polyethylenes (T. Boiangin, Mat. Plastics, III, No. 3, 153, 1965; No. 2, 88, 1966). In addition, this method is disadvantageous in that the produced polyethylene has a low adhesion to metal (for instance, the adhesion value of the polymer to an oxidized copper foil is 800 g/cm) which is one of the important characteristics in the production of adhesives.

It is an object of the present invention to eliminate the above-cited disadvantages.

BRIEF SUMMARY OF THE INVENTION

It is an object of the present invention to provide a process which would make it possible to produce polyethylene with a wide range of MMD and improved adhesion to metal.

This and other objects are accomplished by a process for producing polyethylene by polymerization of ethylene in a medium of a hydrocarbon solvent at a temperature within the range of from $30°-110°$ C. under a pressure of from 1 to 60 atm.g. in the presence of a complex organometallic catalyst containing alkylaluminiumhalide of the formula $AlR_n(X)_{3-n}(I)$, wherein R is an alkyl with a number of carbon atoms from 2 to 18; X is Cl, Br, or Y; n=1 or 2; and oxyvanadiumalkoxide of the formula $OV(OR')_3(II)$, wherein R' is an alkyl with a number of carbon atoms from 2 to 20; in accordance with the present invention in said process use is made of a catalyst containing, in addition to the above-cited components, a complex of acrylonitrile with diethylaluminium chloride of the formula $CH_2=CHCN.Al(C_2H_5)_2Cl$ (III) at a molar ratio I:II:III equal to 5-20:1:1-5, respectively.

The use of the above-mentioned complex organometallic catalyst including a complex of acrylonitrile with diethylaluminium chloride of the formula (III) makes it possible to produce polyethylene with a wide MMD range from 5 to 10 which can readily be processed to articles, e.g. pipes or cable, by the extrusion method. Polyethylene produced by the proposed method has an increased adherence to metal (above 3,000 g/cm) since acrylonitrile (the part of the third catalytic component) is a polar monomer and the traces thereof which remain in the polymer increase adhesive properties of the polyethylene.

DETAILED DESCRIPTION OF THE INVENTION

The process for producing polyethylene is accomplished in the following preferred manner.

Into a reactor previously exempted from moisture and oxygen a hydrocarbon solvent such as gasoline (extractive), n-butane, n-hexane, n-heptane, n-decane, benzene, toluene and then a complex organometallic catalysts and ethylene are charged. The components of the catalyst of the formulae (I), (II), and (III) are introduced into the reactor in the form of their solutions in hydrocarbon solvents; the molar ratio between the components of the catalyst of said formulae (I), (II), and (III) is equal to 1:5-20:1-5, respectively. The molecular mass of the polymer is controlled by hydrogen. When it is desirable to produce superhigh-molecular polyethylene, hydrogen is not required. The process of ethylene polymerization is conducted at a temperature within the range of from 30°-110° C. under a pressure of up from 1 to 60 atm.g. The process is interrupted by introducing ethyl alcohol into the reaction mixture. The resulting suspension of polyethylene in the hydrocarbon solvent is discharged from the reactor and subjected to filtration or centrifugation. The polyethylene powder separated from the liquid phase is dried to a content of volatile compounds 0.15 wt.% and is characterized by the following physico-mechanical parameters: molecular-mass distribution (MMD), melt index (MI), yield point in stretching ($\delta_T$), ultimate tensile stress ($\delta_p$), relative elongation at rupture (E) and adhesion to metal. Adhesion has been determined by the following procedure: a plate 110×130×1 mm in size is moulded from the polyethylene and oxidized foil is pressed to the plate from both sides. In order that the edge of the foil should not be pressed into the plate, a strip from a triacetate film, approximately 10 mm in width, is placed between the foil and the plate on the 110 mm side of the plate. On the pressed foil working bands are formed 10 mm in width. A movable clamp of the measuring device is fitted to the end of the strip from which a 10 mm piece is torn. The test is run by the method of tearing the foil from the plate at an angle of 90° with the aid of a tearing device. The speed of the movement of the movable clamp is 50±2 mm/min. The minimum from four measurements is accepted as a result of the tests.

The component of the catalyst of the formula (III) comprising a complex of acrylonitrile with diethylaluminium chloride is prepared by following the procedure described by K. Matsumura, O. Fukumoto, J. Polymer Sci, A 1, vol. 9, No 2, 471, 1971. To a solution of 5.3 g of diethylaluminium chloride Al(C$_2$H$_5$)$_2$Cl in 14 ml of benzene in the atmosphere of argon at a temperature of 20°-25° C. an equimolar amount (2.9 g) of acrylonitrile CH$_2$=CHCN are added dropwise under continuous stirring. A complex of acrylonitrile with diethylaluminium chloride CH$_2$=CHCN·Al(C$_2$H$_5$)$_2$Cl (III) is obtained. The composition of said complex was controlled by IR spectroscopy by the presence of the absorption band in the region 2275 cm$^{-1}$.

For a better understanding of the present invention specific examples of realizing the method of producing polyethylene are given hereinbelow by way of illustration.

EXAMPLE 1 (control)

Into a reactor preliminarily freed from moisture and oxygen there are charged 400 ml of gasoline, 0.90 g of diethylaluminium chloride Al(C$_2$H$_5$)$_2$Cl in 50 ml of gasoline, and 0.15 g of oxyvanadiumtriethoxide OV-(OC$_2$H$_5$)$_3$ in 45 ml of gasoline. The molar ratio between diethylaluminium chloride and oxyvanadiumtriethoxide is 10:1, respectively. Into the reactor, ethylene is also fed together with hydrogen taken in the amount of 5% of the ethylene volume. Polymerization is run at 30° C. under a pressure of 10 atm.g. for 1 hour. The resulting suspension is discharged from the reactor and filtered. The filtered powder of polyethylene is dried to a content of volatile compounds of 0.15%. Polyethylene yield is 47 g. The characteristics of the product are given in the Table.

EXAMPLE 2

Into a reactor preliminarily freed from moisture and oxygen there are charged 400 ml of gasoline, 0.90 g of diethylaluminium chloride Al(C$_2$H$_5$)$_2$Cl in 50 ml of gasoline, 0.15 g of oxyvanadiumtriethoxide OV-(OC$_2$H$_5$)$_3$ in 45 ml of gasoline, and 0.13 g of a complex of acrylonitrile with diethylaluminium chloride CH$_2$=CHCN.Al(C$_2$H$_5$)Cl in 5 ml of benzene. The molar ratio between the components is 10:1:1, respectively. Into the reactor ethylene is also fed along with hydrogen taken in the amount of 5% of the ethylene volume. Polymerization is conducted at 30° C. under a pressure of 10 atm.g. for 1 hour. The resulting suspension is discharged from the reactor and filtered. The filtered powder of polyethylene is dried to a content of volatile compounds of 0.15%. The yield of the product is 150 g. The properties of the polymer are given in the Table.

EXAMPLE 3

Into a reactor preliminarily freed from moisture and oxygen there are charged 400 ml of n-butane, 0.90 g of diethylaluminium chloride Al(C$_2$H$_5$)$_2$Cl in 50 ml of n-butane, 0.15 g of oxyvanadiumtriethoxide OV-(OC$_2$H$_5$)$_3$ in 45 ml of n-butane, and 0.64 g of a complex of acrylonitrile with diethylaluminium chloride CH$_2$=CHCN.Al(C$_2$H$_5$)$_2$Cl in 5 ml of benzene. The molar ratio between the above-mentioned components of the catalyst is 10:1:5, respectively. Into the reactor, ethylene is also fed together with hydrogen taken in the amount of 10% of the ethylene volume. Polymerization is run at 50° C. under a pressure of 60 atm.g. for 1 hour. 133 g of polyethylene are obtained with the characteristics given in the Table.

EXAMPLE 4

Into a reactor preliminarily freed from moisture and oxygen there are charged 400 ml of n-heptane, 127 g of didecylaluminium chloride Al(C$_{10}$H$_{21}$)$_2$Cl in 50 ml of n-heptane, 0.15 g of oxyvanadiumtriethoxide OV-(OC$_2$H$_5$)$_3$ in 45 ml of n-heptane, and 0.64 g of a complex of acrylonitrile with diethylaluminium chloride CH$_2$=CHCN.Al(C$_2$H$_5$)$_2$Cl in 5 ml of benzene. The molar ratio between the above-cited catalytic components is 5:1:5, respectively. Into the reactor ethylene is also fed. Polymerization is run at 110° C. under a pressure of 30 atm.g. for 1 hour. The resulting suspension is discharged from the reactor and filtered. The filtered polyethylene is dried to a content of volatile products of 0.15%. 92 g of polyethylene are obtained with the characteristics given in the Table.

EXAMPLE 5

By following the procedure described in Example 1, 400 ml of benzene, 0.47 g of ethylaluminiumdichloride AlC$_2$H$_5$Cl$_2$ in 50 ml of benzene, 0.21 g of oxyvanadium-tributoxide OV(OC$_4$H$_9$)$_3$ in 45 ml of benzene, and 0.38 g of a complex of acrylonitrile with diethylaluminium chloride in 5 ml of benzene are charged into a reactor. The molar ratio between the catalytic components is 5:1:3, respectively. Into the reactor, ethylene is also fed together with hydrogen taken in the amount of 10% of the ethylene volume. Polymerization is run at 70° C. under a pressure of 3 atm.g. for 1 hour. 102 g of polyethylene are obtained with the characteristics given in the Table.

EXAMPLE 6

By following the procedure described in Example 1, 400 ml of n-heptane, 3.24 g of dibutylaluminium bromide $Al(C_4H_9)_2Br$ in 50 ml of n-heptane, 0.33 g of oxyvanadiumtrioctaoxide $OV(OC_8H_{17})_3$ in 45 ml of n-heptane, 0.25 g of a complex of acrylonitrile with diethylaluminium chloride in 5 ml of benzene are charged into a reactor. The molar ratio between the catalytic components is 20:1:2, respectively. Into the reactor ethylene is also fed along with hydrogen taken in the amount of 10% of the ethylene volume. Polymerization is run at 50° C. under a pressure of 30 atm.g. for 1 hour. 85 g of polyethylene are obtained with the characteristics given in the Table.

EXAMPLE 7

Into the reactor preliminarily freed from moisture and oxygen there are charged 400 ml of n-hexane, 2.67 g of diisopropylaluminium iodine $Al(i-C_3H_7)_2J$ in 50 ml of n-hexane, 0.15 g of oxyvanadiumtriethoxide $OV(OC_2H_5)_3$ in 45 ml of n-hexane, and 0.52 g of a complex of acrylonitrile with diethylaluminium chloride in 5 ml of benzene. The molar ratio between the components of the catalyst is 15:1:4, respectively. Ethylene and hydrogen are also fed into the reactor, hydrogen being taken in the amount of 15% of the ethylene volume. Polymerization is run at 50° C. under a pressure of 10 atm.g. for 1 hour. 65 g of polyethylene are obtained with the characteristics given in the Table.

EXAMPLE 8

By following the procedure described in Example 1, 400 ml of toluene, 1.39 g of ethylaluminiumdichloride $AlC_2H_5Cl_2$ in 50 ml of toluene, 0.18 g of oxyvanadiumtriisopropyloxide $OV(Oi-C_3H_7)_3$ in 45 ml of toluene, and 0.38 g of a complex of acrylonitrile with diethylaluminiumchloride in 5 ml of benzene are charged into a reactor. The molar ratio between the catalytic components is 15:1:3, respectively. Into the reactor, ethylene is also fed together with hydrogen taken in the amount of 10% of the ethylene volume. Polymerization is run at 30° C. under a pressure of 20 atm.g. for 1 hour. 75 g of polyethylene with the characteristics given in the Table are obtained.

EXAMPLE 9

By following the procedure described in Example 1, there are charged into a reactor 400 ml of n-heptane, 2.10 g of dioctadecylaluminium chloride $Al(C_{18}H_{37})_2Cl$ in 50 ml of n-heptane, 0.15 g of oxyvanadiumtriethoxide $OV(OC_2H_5)_3$ in 45 ml of n-heptane, and 0.13 g of a complex of acrylonitrile with diethylaluminium chloride in 5 ml of benzene. The molar ratio between the above-cited components of the catalyst is 5:1:1, respectively. Ethylene and hydrogen are also introduced into the reactor, hydrogen being taken in the amount of 15% of the ethylene volume. Polymerization is run at 80° C. under a pressure of 5 atm.g. for 1 hour. 60 g of polyethylene are obtained with the characteristics given in the table.

EXAMPLE 10

By following the procedure described in Example 1, there are charged into a reactor 400 ml of n-decane, 2.58 g of dibutylaluminium chloride $Al(C_4H_9)_2Cl$ in 50 ml of n-decane, 0.71 g of oxyvanadiumtridodecyloxide $OV(OC_{20}H_{41})_3$ in 45 ml of n-decane, and 0.13 g of a complex of acrylonitrile with diethylaluminiumchloride in 5 ml of benzene. The molar ratio between the above-cited catalytic components is 20:1:1, respectively. Ethylene and hydrogen are also fed into the reactor, hydrogen being in the amount of 5% of the ethylene volume. Polymerization is run at 50° C. under a pressure of 15 atm,g. for 1 hour. 73 g of polyethylene with the characteristics given in the Table are obtained.

Table

Physico-mechanical properties of polyethylene obtained in examples 1–10

| Nos. of examples | MMD | MI g/10 mm | $kgc/cm^2$ | $kgc/cm^2$ | % | Adhesion to oxidized copper foil, g/cm |
|---|---|---|---|---|---|---|
| 1 | 2.5 | 8.7 | 315 | 320 | 17 | 800 |
| 2 | 5 | 1.0 | 295 | 305 | 750 | 3500 |
| 3 | 8 | 0.7 | 285 | 360 | 800 | 4000 |
| 4 | 6 | does not flow | 315 | 360 | 870 | 4000 |
| 5 | 8 | 0.65 | 295 | 320 | 740 | 3500 |
| 6 | 7 | 0.8 | 315 | 340 | 750 | 3700 |
| 7 | 10 | 2.0 | 295 | 300 | 650 | 3800 |
| 8 | 7 | 1.3 | 310 | 315 | 760 | 4000 |
| 9 | 6 | 3.5 | 275 | 320 | 450 | 4000 |
| 10 | 8 | 1.1 | 264 | 340 | 640 | 3800 |

The data presented in the Table show that the proposed process for producing polyethylene with the use of the catalyst consisting of alkylaluminiumhalide of the general formula $AlR_n(X)_{3-n}$ (I), wherein R is alkyl with a number of carbon atoms from 2 to 18; X is Cl, Br, I; n=1 or 2; oxyvanadiumalkoxide of the general formula $OV(OR')_3$ (II), wherein R' is an alkyl with a number of carbon atoms from 2 to 20; and a complex of acrylonitrile with diethylaluminium chloride of the general formula $CH_2=CHCN.Al(C_2H_5)_2Cl$ (III) at a molar ratio between the above-cited components of the catalyst I:II:III equal to 5–20:1:1–5, respectively, makes it possible to produce polyethylene with a wide MMD range (from 5 to 10) and an increased adhesion to metal (more than 3000 g/cm).

What is claimed is:

1. A process for producing polyethylene which comprises polymerizing ethylene in a medium of a hydrocarbon solvent at a temperature within the range of from 30°–110° C. under a pressure of from 1 to 60 atm.g. in the presence of a complex organometallic catalyst; said catalyst consisting of alkylaluminiumhalide of the general formula $AlR_n(X)_{3-n}$ (I), wherein R is an alkyl with a number of carbon atoms from 2 to 18; X is Cl, Br, or I; n=1 or 2; oxyvanadiumalkoxide of the general formula $OV(OR')_3$ (II), wherein R' is an alkyl with a number of carbon atoms from 2 to 20, and a complex of acrylonitrile with diethylaluminiumchloride of the formula $CH_2=CHCN.Al(C_2H_5)_2Cl$ (III); the molar ratio between said catalytic components I:II:III being equal to 5–20:1:1–5, respectively.

* * * * *